United States Patent [19]

Fulton

[11] 4,266,176

[45] May 5, 1981

[54] INDUCTION MOTOR SLIP FREQUENCY CONTROLLER

[75] Inventor: Donald E. Fulton, Stoneham, Mass.

[73] Assignee: The Charles Stark Draper Laboratory, Inc., Cambridge, Mass.

[21] Appl. No.: 70,856

[22] Filed: Aug. 29, 1979

[51] Int. Cl.³ .............................................. H02P 5/40
[52] U.S. Cl. .................................... 318/801; 318/811; 318/812
[58] Field of Search .............................. 318/798–803, 318/805, 807–812

[56] References Cited

U.S. PATENT DOCUMENTS

| 3,568,022 | 3/1971 | Domann | 318/801 |
| 3,644,721 | 2/1972 | Preiser | 318/801 |
| 3,731,169 | 5/1973 | Burgholte et al. | 318/801 |
| 3,887,853 | 6/1975 | Klein et al. | 318/801 |
| 3,917,989 | 11/1975 | Bereisa, Jr. | 318/801 |
| 4,091,294 | 5/1978 | Zankl et al. | 318/801 |

Primary Examiner—Gene Z. Rubinson
Attorney, Agent, or Firm—Kenway & Jenney

[57] ABSTRACT

A slip frequency controller for an induction motor. The controller includes an oscillator for providing a high frequency ($f_o$) pulse stream which is counted down by first counter having modulo M and a second counter with modulo M+K, where M is a positive integer, K is a positive or negative integer, and K is small compared with M. An incremental shaft encoder provides a relatively low frequency pulse stream having a pulse repetition frequency equal to M times the shaft rotation frequency for the motor times the number of pole pairs in the motor. Each pulse produced by the encoder represents an angular increment in position of the motor shaft. The output frequency of the first counter is slightly modified from the nominal $f_o/M$ by a pulse adder/subtracter network which either adds or subtracts a pulse from the input pulse stream applied to the first counter each time a pulse is received from the shaft encoder. The output frequency of the first counter is then $f_o/M$ plus or minus the shaft frequency times the number of pole pairs. The output frequency of the second downcounter is approximately equal to $$\frac{f_o}{M}\left(1 - \frac{K}{M}\right).$$

The output pulse streams from both counters are mixed to obtain a low frequency beat note which has a waveform that approximates a sinewave and which corresponds to the desired stator frequency. The slip frequency may be discretely varied by digitally controlling the modulus of the second counter. Alternatively, the slip frequency may be continuously varied by controlling the frequency of the high frequency oscillator.

28 Claims, 8 Drawing Figures

INDUCTION MOTOR SLIP FREQUENCY CONTROLLER

DESCRIPTION

FIELD OF THE INVENTION

This invention relates to induction motors, and more particularly, to networks for controlling the slip frequency of induction motors.

BACKGROUND OF THE DISCLOSURE

In general, an induction motor includes a stator having a drive or excitation coil assembly, and a rotor having shorted coil assembly with a plurality of pole pairs. Typically, the stator is stationary while the rotor is rotatable with respect to the stator and is coupled to an output shaft for the motor. The motor generates torque due to the interaction between the stator magnetic field and the rotor magnetic field. The magnetic field of the rotor is induced from the stator by rotating the stator field at a somewhat different rate than the rotor rate. The difference frequency between the shaft (times the number of pole pairs of the motor) and the stator field frequency is known as the slip frequency. This slip frequency is seen by the shorted turns on the rotor. It is well known that the slip frequency strongly influences the basic machine characteristics such as torque constant and efficiency.

In the prior art, control of the induction motor may be achieved by employing a slip control loop, that is, a feedback loop around an induction motor that slaves the stator excitation frequency to be controlled in order to establish frequency difference above or below the shaft or rotor rotation frequency (times the number of motor pole pairs). That control may be achieved using a tachometer to convert shaft frequency to voltage. An offset voltage is added to represent the desired slip, and the resultant voltage is used to control a variable controlled oscillator (VCO). Since the slip frequency is typically only a few percent of the maximum motor frequency, this implementation is extremely sensitive to gain errors and non-linearities in both the tachometer and the VCO. Also, a tachometer is a relatively expensive transducer. In various alternative approaches in the prior art, mechanical differentials have been used in the slip loop, as well as circuits which estimate the slip from processing motor parameters and resolvers coupled to the output shaft. However, these approaches too pose substantial limitations. For example, the mechanical differential is a relatively costly device. Estimating slip from motor parameters is difficult due to the signal-to-noise ratio being relatively poor and the electrical model for the motor is temperature sensitive. In addition, the motor parameter processing approach is relatively ineffective at start, since there is no reflected voltage to sense. A resolver approach is in principal a satisfactory solution, however, in practice, the ruggedness and low maintenance characteristics of an induction motor cannot be matched to the use of slip rings. Another limitation in the above approaches is posed by the use of analog circuits which suffer from environmental conditions such as temperature. Furthermore, the response of the prior art and particularly the analog control systems is relatively slow.

U.S. Pat. Nos. 3,644,721 (Preiser), 3,568,022 (Domann) and 3,731,169 (Burgholte, et al.) illustrate another prior art induction motor controller approach using digital signal processing. In these systems, a pulse stream pulse repetition having frequency (prf) proportional to the output shaft is added (in frequency) to a pulse stream having a prf proportional to the desired slip frequency. The resultant pulse stream is used to drive an inverter network which in turn drives the stator coil assembly. However, the stator drive is generally a single, coarsely quantized, pulsed waveform and thus unsuited for driving a pulse-width modulated invertor for controlling an induction motor. The preferred drive signal for a pulse-width modulated inverter is a controlled amplitude sinewave at the desired stator frequency. For a multiphase motor multiphase controlled amplitude sinewave drives are required. Although the smoothing frequency tracking loop of Domann might reduce some of the waveform coarseness, the cost of that reduction is a substantial reduction in the system transient response.

It is an object of the present invention to provide a digital system for controlling the slip frequency of an induction motor.

Yet another object is to provide an induction motor slip control system having a relatively fast response to control variations in the slip frequency.

Still another object is to provide voltage or current references for PWM inverters for a fast response induction motor controller.

Another object is to provide multiple phase, controlled amplitude, sinusoidal-like waveforms for PWM inverters for a fast response induction motor controller.

SUMMARY OF THE INVENTION

Briefly, according to one form of the present invention, the control system is adapted for use with an induction motor with a stator having a drive, or excitation, coil assembly and a rotor having a shorted coil assembly coupled to an output shaft for the motor. The control system includes a high frequency oscillator adapted to generate a first pulse stream having a predetermined pulse repetition frequency (prf). An incremental shaft position transducer is coupled to the motor shaft adapted to produce a second pulse stream having a prf proportional to the output shaft rotation frequency. A pulse frequency adder/subtractor network is coupled to the oscillator and transducer, and is adapted to generate a third pulse stream having a prf equal to the sum of the prf's of the first and second pulse streams when the shaft rotates in a first direction, and the difference of those prf's when the shaft rotates in the opposite direction.

A first divider network is coupled to the adder/subtracter network and is adapted to generate a fourth pulse stream having a prf equal to the prf of the third stream divided by the constant of proportionality (M) relating the output shaft frequency with the prf of the second pulse stream.

Thus, the average output frequency of the first divider network is the original frequency produced by the oscillator divided by M plus or minus the shaft frequency (times the number of motor pole pairs). The plus/minus factor provides for bi-directional shaft rotation. The direction of shaft rotation is detected conventionally using incremental pulse transducers, for example, using two quadrature pick-ups. In some embodiments, only a single shaft direction rotation may be utilized with either a plus or minus being selectively utilized.

A second divider network is coupled to the oscillator and is adapted to generate a fifth pulse stream having a prf equal to the nominal oscillator frequency divided by the sum of the constant of proportionality M and an integer K, where K is a positive or negative integer having an absolute value which is small compared with M. In practice, K may be selectively varied by varying the countdown modulus of the second divider network. For non-zero K, this variation represents a discretely adjustable slip frequency.

A frequency difference network is coupled to the first and second dividers for generating the stator drive signal having an output frequency equal to the difference between the prf's of the fourth and fifth pulse streams.

With this configuration, the output signal from the high frequency oscillator is in one branch counted down by M+K and in the other branch augmented by pulses representative of shaft rotation and then counted down by M. In one form of the invention, the resultant signals from each of the branches are beaten together and a low pass filter is used to recover the beat note. The beat note has the desired frequency for the stator drive, and may be used in conjunction with an inverter for driving the stator coils.

With this configuration, the slip frequency can be varied by changing the frequency of the oscillator, providing an analog control of the slip frequency, or by changing the countdown modulus of the second divider network, providing discrete control of the slip frequency. In addition, a relatively inexpensive contactless pulse incremental position transducer is used as the transducer element. The use of digital circuitry for generating and processing the pulse streams provides high accuracy operation with a relatively low degree of critical adjustments or tolerances.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
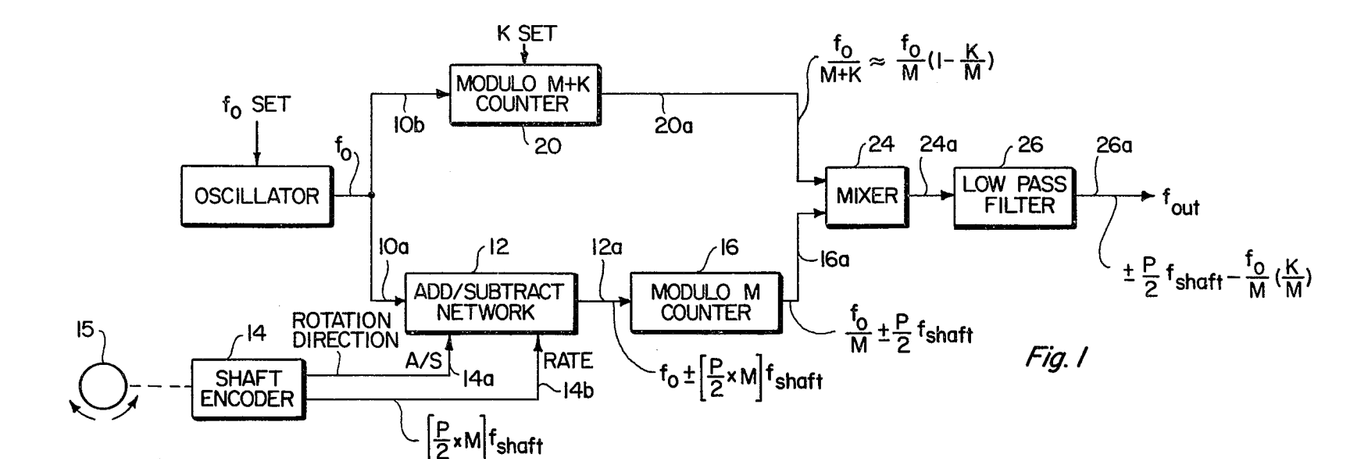
FIG. 1 shows in block diagram form an embodiment of the present invention.

An exemplary induction motor controller according to the present invention is shown in FIG. 1. In that figure, an oscillator 10 provides a high frequency pulse stream having a frequency denoted $f_o$. In the illustrated embodiment, the output frequency of oscillator 10 may be varied. In other embodiments, $f_o$ may be preset. The output pulse stream from oscillator 10 is applied to a first branch by way of line 10a which includes a pulse adder/subtractor network 12. The pulse stream is coupled to a first input of network 12.

An incremental shaft encoder 14 is adapted to sense motion of the output shaft 15 of the induction motor-to-be-controlled. The shaft encoder 14 is a conventional shaft position incremental encoder, for example, an optical type model EC82 manufactured by Disc Instruments, which is adapted to detect rotary motion of the shaft 15, and provide output signals on lines 14a and 14b representative of the rotational direction of shaft 15 (for example, as determined by a pair of quadrature pickups), and the angular rotation rate of the shaft 15, respectively. In the present embodiment, the signal on line 14b is a pulse stream having a pulse repetition frequency (prf) equal to $P/2 \times M \times f_{shaft}$ is the shaft rotation frequency, M is a positive integer, and P/2 is the number of pole pairs of the motor. Thus, each pulse represents the unit of angular rotation of shaft 15. The rate signal on line 14b is coupled to a second input of network 12, and the rotation direction signal on line 14a is coupled to an add/subtract (A/S) control input for the network 12. The rotation direction dependence of network 12 provides for bi-directional operation of the motor having shaft 24. In various embodiments, only single direction operation may be utilized. In such embodiments, the network 12 need only be a pulse adder or a subtractor network, as desired.

The network 12 is adapted to provide an output signal on line 12a in the form of a pulse stream having a prf equaling the sum of the prf's of the signals on lines 10a and 14b when the shaft 15 rotates in a first direction, and equaling the difference of those prf's when the shaft 15 rotates in the opposite direction. As a result, the prf of the pulse stream on line 12a may be expressed as $f_o \pm (P/2 \times M)f_{shaft}$, where the ± denotes the direction of rotation of the shaft 24. A modulo M downcounter 16 is coupled to the line 12a to provide output on line 16a in the form of a pulse stream having a prf equal to $f_o \pm (P/2)f_{shaft}$.

The pulse stream generated by oscillator 10 is also applied by way of line 10b to a second branch which includes a modulo (M+K) downcounter 20, where K is a positive or negative integer and is relatively small compared with M. In the present embodiment, the counter 20 is digitally programmable so that the K portion of the modulus may be selectively set. In alternative embodiments K may be preset. Counter 20 provides a stream of pulses on line 20a having a frequency $f_o/(M+K)$. For values of K which are much less than M, the output frequency of the pulse stream on line 20a is approximately equal to $f_o/M(1-K)$.

The pulse streams on line 16a and 20a are applied to the input of a mixer 24, whose output is in turn passed through a low pass filter 26. In the preferred embodiment, the mixer 24 is an exclusive OR gate, although alternative circuits may readily be used. The mixer network 24 produces a beat note on line 24a, in effect, subtracting the slip frequency produced by counter 20 from the shaft frequency signal produced by counter 16. The high frequency signal produced by oscillator 10 is preferably at least ten times higher than the maximum motor frequency, so that the high frequency signal and its harmonics may readily be filtered out by the filter 26. The beat note produced by the mixer 24 and passed by filter 26 corresponds to the desired stator frequency.

Thus, the output signal on line 26a has a frequency corresponding to a desired stator drive, which is $\pm(P/2 \times f_{shaft}) - (f_o/M \times K/M)$, or alternatively expressed, plus or minus (depending on the rotation direction of the shaft 15) the number of pole pairs times the mechanical shaft frequency ± the slip frequency. The slip frequency term $f_o/M \times K/M$ may be discretely adjusted by varying K, or continuously adjusted by varying $f_o$.

Figure 2:
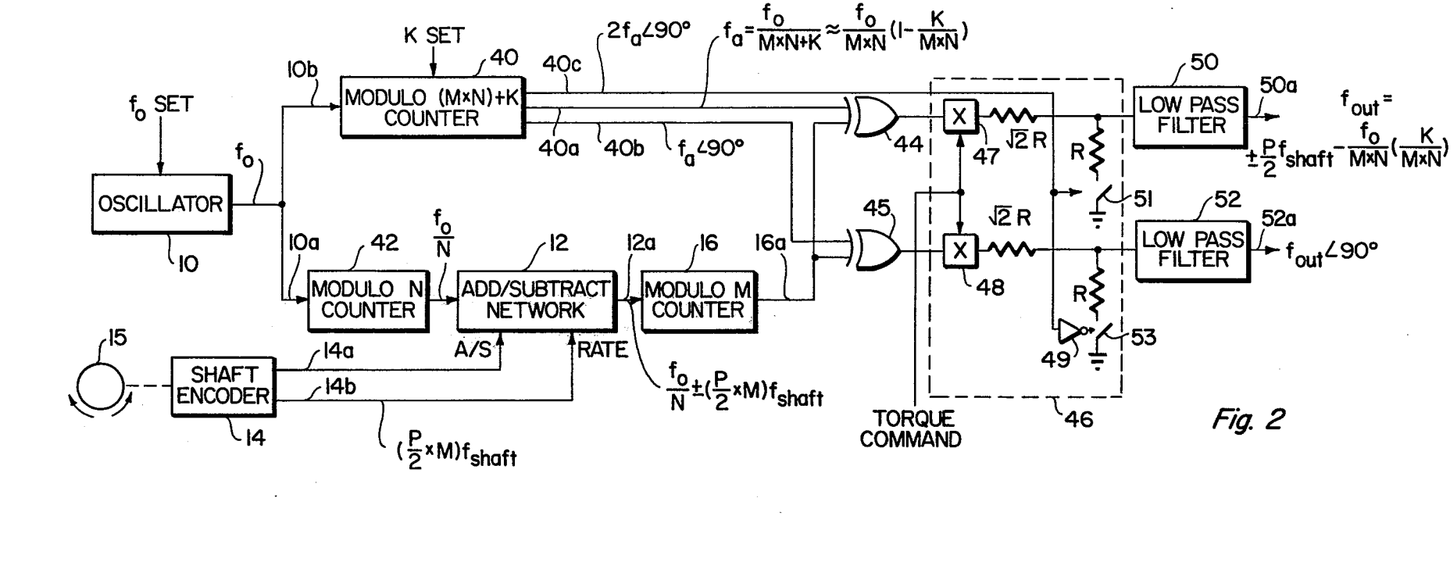
FIG. 2 shows in block diagram form, an alternative embodiment of the present invention.

FIG. 2 shows an alternative embodiment which is similar to that shown in FIG. 1. In FIG. 2, elements corresponding to those in FIG. 1 are identified with identical reference designations. The configuration of FIG. 2 is adapted to provide the current commands (both frequency and amplitude) for a two phase induction motor. These signals are denoted in FIG. 2 as $f_{out}$ and $f_{out}\angle 90°$.

In the embodiment of FIG. 2, in effect, a modulo N counter is added, in effect, to both the first and second branches of the circuit extending from oscillator 10. In the first branch, i.e. between oscillator 10 and network 12, a modulo N counter 42 is inserted so that the input pulse stream to network 12 has a prf equal to $f_o/N$. As a result, the pulse stream on line 12a has a frequency equal to $f_o/N \pm (P/2 \times M)f_{shaft}$.

In the second branch, the counter 20 of the FIG. 1 embodiment has been replaced by a modulo ($(M \times N)+K$) counter 40, where K is a positive or negative integer and is small compared with $M \times N$. The added length of this counter permits the slip frequency step size to be made conveniently small. The counter 40 includes associated circuitry adapted to produce square wave signals on three output lines 40a, 40b, and 40c. The signal on the first line 40a has a frequency, or prf, (denoted $f_a$), which equals $f_o$, and thus approximately equals $$f_o (1 - \frac{K}{M \times N}),$$

since K is small compared with the product $M \times N$. The signal on the second line 40b has the same frequency, or prf (denoted $f_a\angle 90°$), but is phase shifted 90 degrees with respect to the signal on line 40a. The signal on line 40c has a frequency or prf, twice that of the signals on lines 40a and 40b, and is phase shifted 90 degrees at its frequency with respect to the signal on line 40a i.e. the rising and falling edges of the signal on line 40c are mid-way between the rising and falling edges of the signals on lines 40a and 40b.

The mixer 24 and filter 26 of the FIG. 1 configuration is replaced by a pair of exclusive OR gates 44 and 45 and a pulse-width pulse-height multiplier network 46 adapted to generate beat notes in quadrature for producing a rotating stator field in an induction motor. The multiplier 46 includes two multiplier networks 47 and 48, each having a first input coupled to a common externally-applied torque command. The outputs of each of multipliers 47 and 48 are coupled to the connected low pass filters (LPF's) 50 and 53 by resistor/switch network which include pairs of series-connected resistor elements and associated switches S1 and S2. The switches are controlled, respectively, by the 90 degree phase shifted double frequency signal (from line 40c) and the 270 degree phase shifted double frequency signal (generated by inverter 49). The low pass filters 50 and 52 produce stator drive signals on output lines 50a and 52a, respectively.

The pulse-width pulse-height multiplier 46 processes the output signals from the exclusive-OR gates 44 and 45 in two ways: first, the externally applied torque command scales the amplitude of the applied beat notes and second, an amplitude weighting switch driven by line 40c removes the third and fifth harmonics from the beat note, making the resultant signals substantially sinusoidal, and thus, compatible with conventional sinusoidally wound motors. The resultant signals from multiplier 46 are on line 50a applied by way of low pass filters 50 and 52 to provide $f_{out}$ and $f_{out}\, 90°$ on output lines 50a and 52a, respectively. These signals have a beat frequency equal to $$\pm (\frac{P}{2})f_{shaft} - \frac{f_o}{M \times N} \frac{K}{M \times N}$$

and are 90 degrees apart in phase. $f_{out}$ and $f_{out}\angle 90°$ may be applied directly to conventional current feedback power stages to control an induction motor. As in the configuration of FIG. 1, the frequency of oscillator 10 may be continuously varied, or alternatively, the change in modulus of counter 40 from $M \times N$ may be either fixed or digitally controlled.

By way of example, a common 60 Hz maximum induction motor may utilize the following parameters:

| | | |
|---|---|---|
| Reference oscillator | ($f_o$) | 1 MHz to 20 MHz |
| Transducer Resolution per Electrical Cycle | (M) | 32 (11.25° per pulse) |
| Motor Pole Pairs | (P/2) | 2 |
| Fixed Countdown | (N) | 52 |
| Carrier Frequency | $\left(\frac{f_o}{M \times N}\right)$ | 0.6 KHz to 12 KHz |

With this configuration, the output signal having frequency $f_{out}$ will track the shaft from zero to 60 Hz in either direction. The slip frequency can be set as follows:

| | |
|---|---|
| Digital input (vary K) | K × 0.36 Hz (approximately) K = 0,1,2,3 ... |
| Analog input (vary $f_o$) | ±0.36 Hz to ±7.2 Hz for K = ±1 ±0.72 Hz to ±14.4 Hz for K = ±2 |

The above embodiment provides an exemplary system for a two phase motor. Signals for a three phase converter can be obtained with a standard two phase or three phase converter, or three beat notes may be directly generated using techniques similar to those illustrated in FIG. 2. By way of example, for a three phase motor, the modulo $(M \times N)+K$ counter 40 would have three $f_a$ outputs at angle 0°, 120° and 240°. These would be mixed in three exclusive-OR gates each having one input from line 16a and one of the 0°, 120° or 240° output signals from counter 40. Third and fifth harmonic rejection would be provided by the application of three double frequency outputs from counter 40 having phase shifts (with respect to $f_a$) 90°, 120°+90°, and 240°+90° at their double frequency to respective resister-switch network coupling the respective exclusive-OR gates and their associated LPF's.

Figure 3:
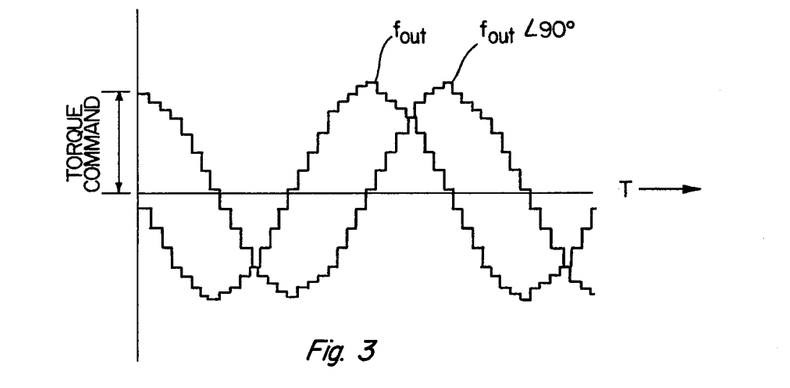
FIGS. 3-5 illustrate exemplary stator waveforms produced by the system of FIG. 2 under selected conditions.
Figure 4:
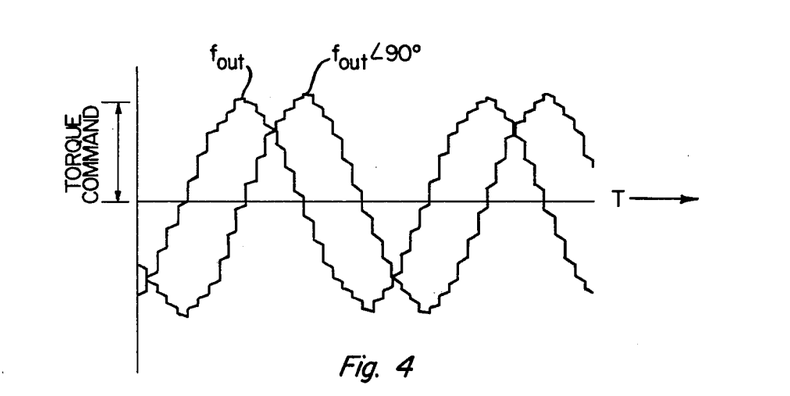
Figure 5:
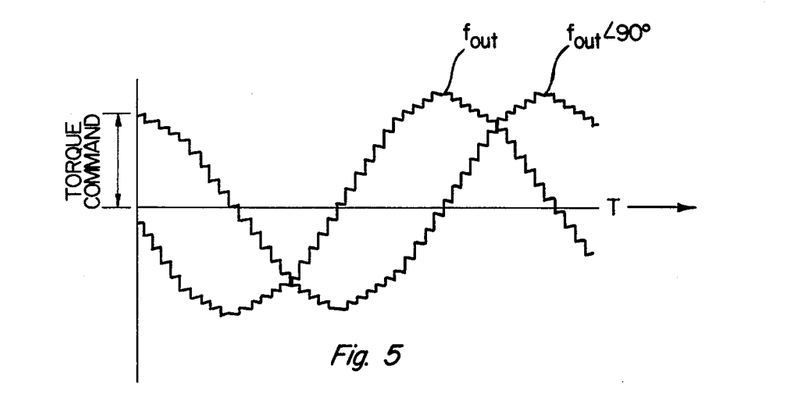

FIGS. 3-5 shows the exemplary stator waveforms generated by the configuration of FIG. 2 at 100 msec/-division, with M=32 at a slow motor rotation speed of $(P/2)f_{shaft}=1.66$ Hz. FIGS. 3-5 show the waveforms under conditions of no slip (no torque), +0.45 Hz slip (+torque), and −0.45 Hz slip (−torque), respectively. The finite quantization introduced by the transducer (encoder 14) can be seen by the 32 small phase jumps per cycle. In general, this small stepping of the stator field angle does not cause any significant torque variations even at low speeds. The near instantaneous response of the circuit can be seen in the 11.25 degrees phase jumps that occur each time a pulse is received from the transducer. The slip signal can be seen in FIGS. 3-5 as zero, upward, and downward sloped phase ramps that are most apparent between the transducer induced phase jumps. The average slip phase ramps are responsible for the frequency difference between the three fiqures.

Figures 6, 7:
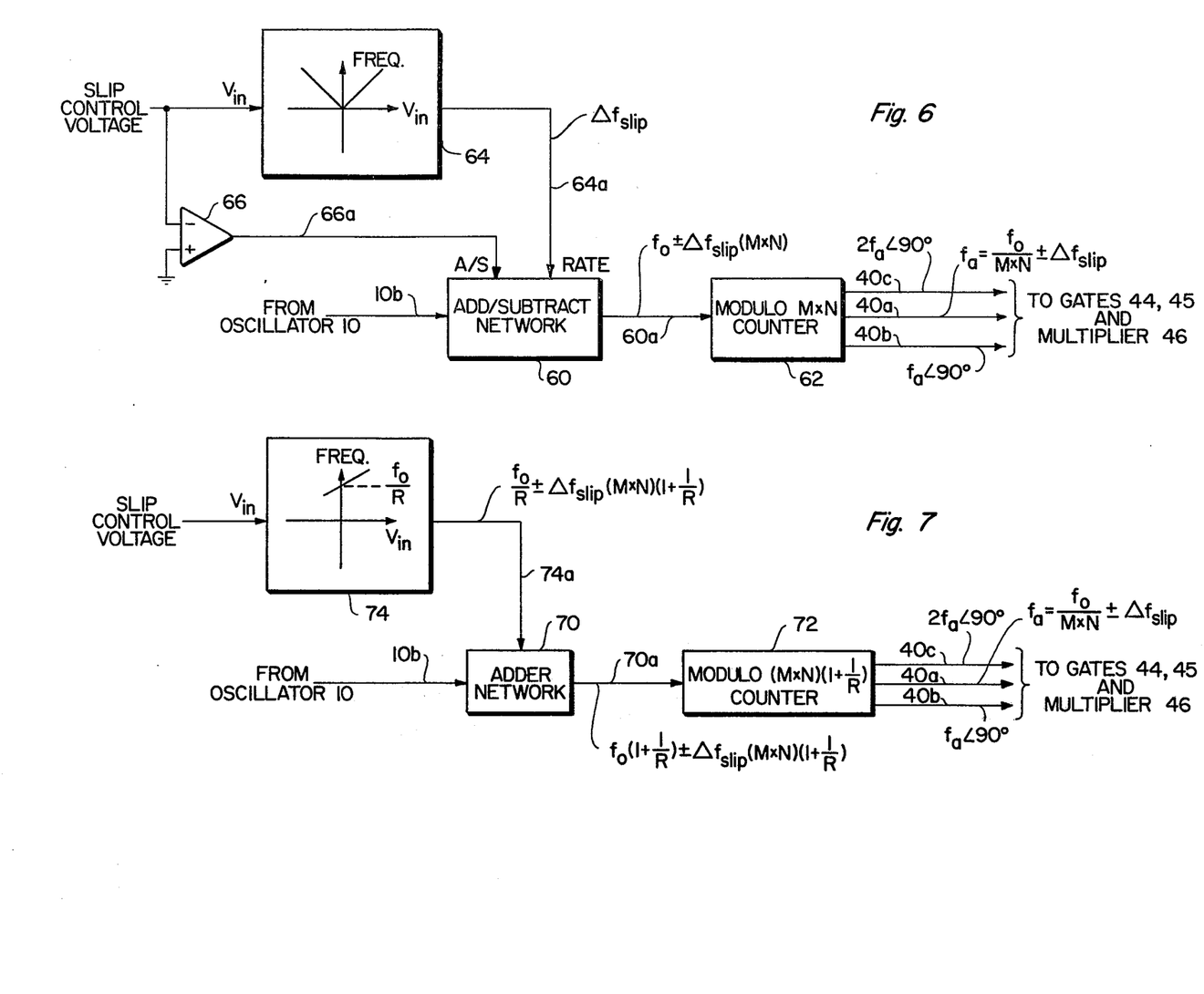
FIGS. 6 and 7 show in block diagram form alternate configurations for one branch of the system of FIG. 2.

FIGS. 6 and 7 show networks which may be substituted for counter 40 in the configuration of FIG. 2. Both of these variants permit the slip to be varied smoothly through zero.

The configuration of FIG. 6 includes a pulse adder/-subtracter network 60 and modulo M×N counter 62 coupled between lines 10b and lines 40a, 40b and 40c of the FIG. 2 configuration. A voltage controlled oscillator (VCO) 64 provides a pulse stream on line 64a to be added or subtracted from the pulse stream on line 10b in network 60. VCO 64 is a conventional VCO which has a frequency versus control voltage ($V_{IN}$) characteristic which is monotonically increasing in with the absolute value of ($V_{IN}$) and is equal to zero at $V_{IN}=0$. With this configuration, the signal on line 64a has a frequency equal to $+\Delta f_{slip}(M \times N)$. A differential amplifier 66 controls the network 60 to either add or subtract the pulse streams on lines 10b and 64a depending on the polarity of the VCO control voltage. As a result, the frequency of the signal on line 60a equals $f_o + \Delta f_{slip}(M \times N)$, and the signal denoted $f_a$ on line 40a is a square wave having a frequency or prf equal to $f_o/(M \times N) + \Delta f_{slip}$. The signals on lines 40b and 40c are square waves having frequencies $f_a$ and $2f_a$, respectively, and are both phase shifted with respect to the signal on line 40a by 90 degrees at their respective frequencies.

The configuration of FIG. 7 includes a pulse adder network 70 and modulo ( (M×N) (1+1/R) ) counter (where M×N/R is an integer) 72 coupled between lines 10b and lines 40a, 40b and 40c of the FIG. 2 configuration. A voltage controlled oscillator (VCO) 74 provides a pulse stream on line 74a to be added to the pulse stream on line 10b in adder network 70. VCO 74 is a conventional VCO which has a frequency versus control voltage ($V_{IN}$) characteristic which is relatively smoothly varying about $V_{IN}$ and which has an output frequency equal to $f_o/R$ at $V_{IN}=0$. With this configuration, the signal on line 74a has a frequency equal to $f_o + \Delta f_{slip\,(M \times N)}(1+1/R)$, or a nominal slip frequency $f_o$ plus or minus a deviation established by the control voltage for VCO 74. The signal on line 70a consequently has a frequency $f_o(1+1/R) + \Delta f_{slip\,(M \times N)}(1+1/R)$, and the signal denoted $f_a$ on line 40a is a square wave having a frequency $f_o/(M \times N) + \Delta f_{slip}$. The signals on lines 40b and 40c are square waves having frequencies $f_a$ and $2f_a$, respectively, and are both phase shifted with respect to the signal on line 40a by 90 degrees at their respective frequencies.

Figure 8:
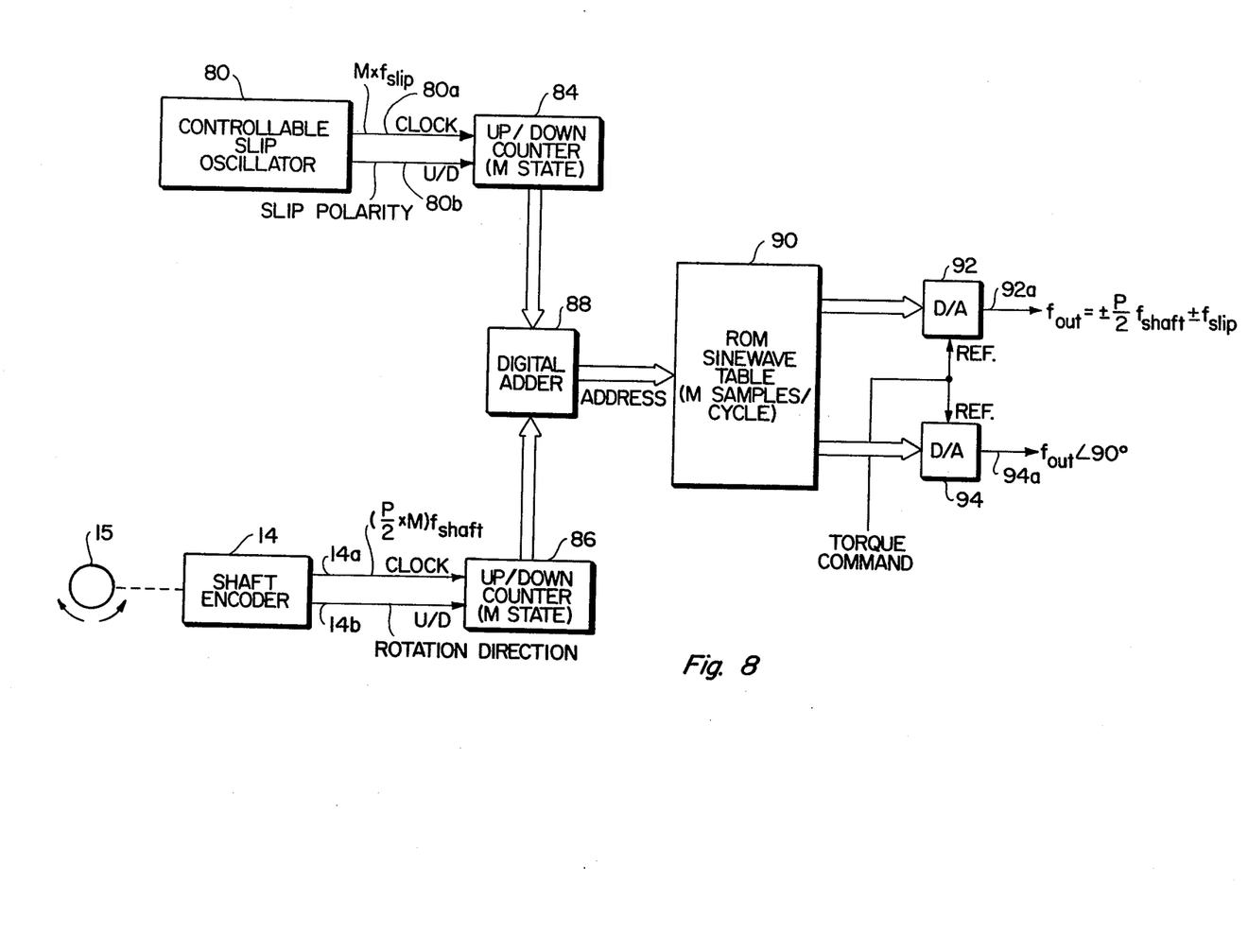
FIG. 8 shows in block diagram form yet another alternate embodiment of the present invention.

FIG. 8 shows an alternate implementation of the present invention that is particularly well suited for a microprocessor based controller. In FIG. 8 elements having corresponding elements in the embodiment of FIG. 1 are denoted by identical reference designations. The illustrated system provides stator drive signals for a two phase induction motor having P pole pairs. In that system, a controllable slip oscillator 80 provides a pulse stream with frequency $M \times f_{slip}$ on line 80a and a slip polarity signal on line 80b. The signal on line 80a is coupled to the clock input of a first M-state (modulo M) up-down counter 82 and the signal on line 80b is coupled to the count direction (U/D input of counter 82. As a result, the counter 82 either up or down counts the pulses applied on line 80a depending on the state of the polarity signal on line 80b.

The system of FIG. 8 also includes a shaft encoder 14 which provides a pulse stream at frequency $(P/2 \times M \times f_{shaft})$ on line 14a representative of angular motion of the motor shaft 15 (i.e. each pulse representing a predetermined increment of rotation of shaft 15) and a rotation direction signal on line 14b representative of the direction of rotation of shaft 15. The signals on line 14a and 14b are respectively coupled to the clock and direction (U/D) inputs of a second M-state (modulo M) up-down counter 86. As a result, the counter 86 either up or down-counts the pulses applied on line 14a, depending on the state of the direction signal on line 14b.

The counters 84 and 86 provide current count signals representative of the cumulative number of pulses (modulo M) applied to the input lines 80a and 14a, respectively.

The current count signals are applied to a digital adder 88 which periodically generates an updated signal representative of the sum of the applied current count signals. As a result, the phase quantums (i.e. the pulses) from the incremental transducer (encoder 14) and slip oscillator 80 are added in the digital adder 88 and used to form a continually shifting address for a read-only memory (ROM) 90. The ROM 90 stores sine wave (M samples per cycle) values at its respective address locations. Since the incremental phases are added in adder 88, the average frequencies are added. In response to the succession of address signals applied to ROM 90, that necessary provides a two set succession of sine wave sample signals (each signal being representative of the stored value at the respective addressed location). In the present embodiment, the two sets include the same signals, but one set is displaced in time by an amount corresponding to a 90 degree phase shift. For one or three phase motor embodiments, ROM 90 provides a single or three (appropriately phased) set succession of sine wave sample signals.

The sine wave sample signals are applied to digital-to-analog converters 92 and 94 convert the outputs from ROM 90 to the scaled (in response to a torque command signal) amplitude and frequency signals, with appropriate phase, for stator current control. The frequency of the signals on lines 92a and 94a is $\pm(P/2) f_{shaft} \pm f_{slip}$. In alternative embodiments, either or both counter 84 and 86 may be unidirectional, provided only single polarity slip frequencies or unidirectional shaft rotation is desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for generating stator drive signals for an induction motor having a stator with P pole pairs and a rotor coupled to an output shaft, said output shaft having a rotational frequency, $f_{shaft}$, comprising:

A. oscillator means for generating a first pulse stream having a pulse repetition rate (prf) $f_o/N$, where N is an integer constant, B. incremental shaft position transducer means coupled to said shaft, for generating a pulse for each predetermined increment of rotation of said shaft, said pulses forming a second pulse stream having a prf $P/2 \times M \times f_{shaft}$, when M is an integer constant, C. pulse frequency adder/substractor means coupled to said oscillator means and said transducer means, for generating a third pulse stream having a prf equal to the sum or difference of the prf's of said first and second pulse streams, D. means coupled to said adder/substractor means, for generating a fourth pulse stream having a prf equal to the product of 1/M and the prf of said third pulse stream, E. means of generating a fifth pulse stream having a prf equal to $f_o/(M \times N) + \Delta f_{slip}$ where $\Delta f_{slip}$ is a selected value corresponding to a desired slip frequency, F. difference means coupled to said fourth and fifth pulse stream generating means, for generating said stator drive signals, said stator drive signals having a frequency equal to the difference between the prf's of said fourth and fifth pulse streams.

2. The apparatus of claim 1 wherein said fifth pulse stream generating means includes:
means for generating a reference pulse stream having a prf equal to $f_o$,
countdown means including a modulo $((M \times N) + K)$ counter responsive to said reference pulse stream, for generating said fifth pulse stream, where K is a positive or negative integer having an absolute value which is small compared with $M \times N$.

3. The apparatus of claim 1 or 2 wherein $\Delta f_{slip}$ is substantially equal to $$-\frac{f_o}{M \times N} \quad \frac{K}{M \times N}$$

where K is a positive or negative integer.

4. The apparatus of claim 1 wherein said fifth pulse stream generating means includes:
means for generating a reference pulse stream having a prf equal to $f_o$,
voltage controlled oscillator (VCO) means responsive to an applied slip control signal (VIN) to generate a slip variation signal having a frequency $\Delta f_{slip} (M \times N)$ which is portional to the absolute value of the amplitude of said slip control signal,
second pulse frequency adder/subtractor means coupled to said VCO and said reference pulse stream generating means, for generating a sixth pulse stream having a prf equal to the sum of $f_o$ and $\Delta f_{slip} (M \times N)$ when said slip control signal has a first polarity and the difference of $f_o$ and $\Delta f_{slip} (M \times N)$ when said slip control signal has in second polarity,
countdown means including a modulo $M \times N$ counter responsive to said sixth pulse stream, for generating said fifth pulse stream.

5. The apparatus of claim 1 wherein said fifth pulse stream generating means includes:
means for generating a reference pulse stream having prf equal to $f_o$,
voltage controlled oscillator (VCO) means responsive to a slip control signal ($V_{IN}$) to generate a slip variation signal having a frequency $f_o/R + (M \times N)(1 + 1/R) \Delta f_{slip}$ wherein $\Delta f_{slip}$ varies substantially smoothly as a function of $V_{IN}$ and is positive when $V_{IN}$ has a first polarity and is negative when $V_{IN}$ has a second polarity, and wherein $M \times N/R$ is an integer,
pulse frequency adder means coupled to said VCO and said reference pulse stream generating means, for generating a sixth pulse stream having a prf equal to the sum of $f_o$ and the frequency of said slip variation signal,
countdown means including a modulo $(M \times N)(1 \times 1/R)$ counter responsive to said sixth pulse stream for generating said fifth pulse stream.

6. The apparatus of claims 2 or 4 or 5 wherein said induction motor is a two phase motor, and
wherein said countdown means includes:
means for generating a phase-shifted pulse stream having the same prf as said fifth pulse stream and being phase shifted 90 degrees with respect thereto,
wherein said difference means includes:
first mixer and associated loss pass filter (LPF) responsive to said fourth pulse stream and said fifth pulse stream, for generating a first beat note signal, and
second mixer and enuciated low press filter (LPF) responsive to said fourth pulse stream and said phase-shifted pulse stream, for generating a second beat note signal
wherein said first and second beat note signals correspond to said stator drive signals.

7. The apparatus of claim 6 wherein said countdown means further includes means for generating first and second double frequency pulse streams having a prf twice that of said fifth pulse stream, and being phase shifted with respect to said fifth pulse stream 90 degrees and 270 degrees, respectively, at their frequency, and wherein said difference means further includes means for suppressing third and fifth harmonics in said beat note signals.

8. The apparatus of claim 7 wherein said harmonic suppressing means for each beat note signal includes first resistance network coupling said mixer to said associated LPF and a second resistance network coupling the input to said LPF to ground by way of a switch, said switch being controlled by said 90 degree shifted double frequency pulse stream for said first mixer, and by said 270 degree shifted double frequency pulse stream for said second mixer.

9. The apparatus of claims 2 or 4 or 5 wherein said induction motor is a three phrase motor, and
wherein said countdown means includes:
means for generating a first and second phase shifted pulse stream having the same prf's as said fifth pulse stream and being phase shifted 120 degrees and 240 degrees, respectively, with respect thereto,
wherein said difference means includes:
first mixer and associated low pass filter (LPF) responsive to said fourth pulse stream and said fifth pulse stream, for generating a first beat note signal,
second mixer and associated low pass filter (LPF) responsive to said fourth pulse stream and said first phase shifted pulse stream, for generating a second beat note signal,
third mixer and associated low pass filter (LPF) responsive to said fourth pulse stream and second phase shifted pulse stream, for generating a third beat note signal
wherein said first second and third beat note signals correspond to said stator drive signals.

10. The apparatus of claim 9 wherein said countdown means further includes:
means for generating first, second, and third double frequency pulse streams having a prf twice that of said fifth pulse stream, and being phase-shifted with respect to said fifth pulse stream 90 degrees, 210 degrees, and 330 degrees, respectively, at their frequency, and
wherein said difference means further includes means for suppressing third and fifth harmonics in said first, second and third beat note signals.

11. The apparatus of claim 10 wherein said haromonic suppressing means for each beat note signal includes a first resistive network coupling the input of said LPF to ground by way of switch, said switch being controlled by said 90 degree shifted double frequency pulse stream for said first mixer, by said 210 degree shifted double frequency pulse stream for said second mixer, and by said 330 degree shifted double frequency pulse stream for said third mixer.

12. The apparatus of claim 1 wherein said difference means comprises:
a mixer means for mixing signals representing said fourth and fifth pulse streams, and
a low pass filter coupled to said mixer means and adapted to pass signal components at or near said output frequency, and to block signal components at frequencies at or above the prf's of said fourth and fifth pulse streams, wherein said passed signal corresponds to said stator drive signal.

13. The apparatus of claim 1 wherein said difference means comprises:
an exclusive-or circuit having a first input adapted to receive said fourth pulse stream, and a second input adapted to receive said fifth pulse stream, and
a low pass filter coupled to said exclusive-or circuit and adapted to pass signal components at or near said output frequency, and to block signal components at frequencies at or above the prf's of said fourth and fifth pulse streams, wherein said passed signal corresponds to said stator drive signal.

14. Apparatus according to claim 1 wherein said transducer means includes means for generating a direction signal representative of the direction of rotation of said shaft, and
wherein said adder/subtractor means is responsive to said direction signal to generate said third pulse stream with a prf equal to the sum of the prf's of said first and second pulse streams when said shaft rotates in one direction and equal to the difference of the prf's of said first and second pulse streams when said shaft rotates in the other direction.

15. Apparatus according to claim 1 wherein said oscillator means includes means for selecting $f_o$ from a predetermined continuous range of values.

16. Apparatus according to claim 1 wherein said second divider means includes means for selecting K from a predetermined range of discrete integer values.

17. Apparatus for generating a stator drive signal for an induction motor having a stator with P pole pairs and a rotor coupled to an output shaft, said output shaft having a rotational frequency $f_{shaft}$ comprising:

A. oscillator means for generating a first pulse stream having a pulse repetition frequency (prf) equal to $f_o$, B. incremental shaft position transducer means coupled to said shaft, for generating a pulse for each predetermined increment of rotation of said shaft, said pulses forming a second pulse stream having a prf equal to $P/2 \times f_{shaft}$ where M is an integer constant, C. pulse frequency adder/substracter means coupled to said oscillator means and said transducer means for generating a third pulse stream having a prf equal to the sum or difference of the prf's of said first and second pulse streams, D. first divider means coupled to said adder/substractor means for generating a fourth pulse stream having a prf equal to the product of 1/M and the prf of said third pulse stream, E. second divider means coupled to said oscillator means, for generating a fifth pulse stream having a prf equal to $f_o/(M+K)$ where K is a positive or negative integer having an absolute value which is small compared with M, F. difference means coupled to said first and second divider means for generating said stator drive signal, said stator drive signal having an output frequency equal to the difference between the prf's of said fourth and fifth pulse streams.

18. The apparatus of claim 17 wherein said difference means comprises:
a mixer means for mixing signals representing said fourth and fifth pulse streams, and
a low pass filter coupled to said mixer means and adapted to pass signal components at or near output frequency, and to block signal components at frequencies at or above the prf's of said fourth and fifth pulse streams, wherein said passed signal corresponds to said stator drive signal.

19. The apparatus of claim 17 wherein said difference means comprises:
an exclusive-or circuit having a first input adapted to receive said fourth pulse stream, and a second input adapted to receive said fifth pulse stream, and
a low pass filter coupled to said exclusive-or circuit and adapted to pass signal components at or near said output frequency, and to block signal components at frequencies at or above the prf's of said fourth and fifth pulse streams, wherein said passed signal corresponds to said stator drive signal.

20. Apparatus according to claim 17 wherein said transducer means includes means for generating a direction signal representative of the direction of rotation of said shaft, and
wherein said adder/substractor means is responsive to said direction signal to generate said third pulse stream with a prf equal to the sum of the prf's of said first and second pulse streams when said shaft rotates in one direction and equal to the difference of the prf's of said first and second pulse streams where said shaft rotates in the other direction.

21. Apparatus according to claim 17 wherein said oscillator means includes means for selecting for from a predetermined continuous range of values.

22. Apparatus according to claim 17 wherein said second divider means includes means for selecting K from a predetermined range of discrete integer values.

23. Apparatus for generating stator drive signals for an induction motor having a stator with P pole pairs and a rotor coupled to an output shaft, said output shaft havng a rotational frequency $f_{shaft}$, comprising:

A. means for generating a first pulse stream having a pulse repetition rate (prf) $M \times f_{slip}$ where M is an integer constant, and $f_{slip}$ is a selected value corresponding to an desired slip frequency, B. first counter means for generating a current first digital signal representative of the cumulative number of pulses (modulo M) in said first pulse stream, C. incremental shift position transducer means coupled to said shaft, for generating a pulse for each predetermined increment of rotation of said shift, said pulses forming a second pulse stream having a prf $(P/2 \times M)f_{shaft}$, D. second counter means for generating a current second digital signal representative of the cumulative number of pulses (modulo M) in said second pulse stream, E. means for periodically generating a third digital signal,, said third digital signal being representative of the sum of the current first and second digital signals, F. storage means for storing M sampled sine wave values at M addressed storage locations, G. readout means responsive to the succession of said third digital signals to generate a succession of sine wave sample signals including a first set representative of the values from the locations in said storage means having addresses corresponding to the respective ones of said third digital signals, H. d/a converter means for converting said succession of sine wave sample analog signals to analog signals, said analog signals corresponding to said stator drive signals.

24. Apparatus of claim 23 wherein said induction motor is a two phase motor and said readout means includes means for generating said succession of sine wave sample signals so that said succession includes said first set and a second set said second set being representative of the sine wave values of said first set, offset by a 90 degree phase shift.

25. Apparatus according to claim 23 wherein said induction motor is a three phase motor and said readout means includes means for generating said succession of sine wave sample signals so that said succession includes said first set and a second set and a third set, said second and third sets being representative of the sine wave values of said first set, offset by 120 degree and 240 degree phase-shafts, respectively.

26. The apparatus of claim 23 wherein said first pulse stream generating means further includes means for generating a polarity signal representative of the desired polarity of said desired slip frequency, and wherein said first counter means is a bidirectional counter responsive to said polarity signal to down count the pulses in said first pulse stream when said polarity signal is representative of a first polarity, and to up-count the pulses in said first pulse stream otherwise.

27. The apparatus of claim 26 wherein said transducer means includes means for generating a direction signal representative of the direction of rotation of said shaft, and wherein said second counter means is a bidirectional counter responsive to said direction signal to down-counts the pulses in said second pulse stream when said direction signal is representative of a first direction, and to up-count the pulses in said second pulse stream otherwise.

28. The apparatus of claim 23 wherein said transducer means includes means for generating a direction signal representative of the direction of rotation of said shaft, and wherein said second counter means is a bidirectional counter responsive to said direction signal to down-counts the pulses in said second pulse stream when said direction signal is representative of a first direction, and to up-count the pulses in said second pulse stream otherwise.

* * * * *